US012554722B2

(12) United States Patent
Hou et al.

(10) Patent No.: US 12,554,722 B2
(45) Date of Patent: Feb. 17, 2026

(54) METHOD FOR IMPROVING IDENTIFICATION ACCURACY OF SIMILAR LOGISTICS TRACKING NUMBERS, AND LOGISTICS QUERY SYSTEM

(71) Applicant: DEMON NETWORK TECH. CO., LTD., Shenzhen (CN)

(72) Inventors: Yi Hou, Shenzhen (CN); Haoxiong Li, Shenzhen (CN); Shoubao Chen, Shenzhen (CN); Jinjian Liang, Shenzhen (CN)

(73) Assignee: DEMON NETWORK TECH. CO., LTD., Shenzhen (CN)

( * ) Notice: Subject to any disclaimer, the term of this patent is extended or adjusted under 35 U.S.C. 154(b) by 0 days.

(21) Appl. No.: 18/897,433

(22) Filed: Sep. 26, 2024

(65) Prior Publication Data
US 2025/0013647 A1 Jan. 9, 2025

Related U.S. Application Data

(63) Continuation of application No. PCT/CN2024/071972, filed on Jan. 12, 2024.

(30) Foreign Application Priority Data

Jan. 12, 2023 (CN) .......................... 202310039435.6

(51) Int. Cl.
*G06F 16/00* (2019.01)
*G06F 16/2455* (2019.01)
*G06Q 10/0833* (2023.01)

(52) U.S. Cl.
CPC ... *G06F 16/24564* (2019.01); *G06Q 10/0833* (2013.01)

(58) Field of Classification Search
None
See application file for complete search history.

(56) References Cited

U.S. PATENT DOCUMENTS 9,847,973 B1 * 12/2017 Jakobsson ........... H04L 63/0245
10,438,162 B2 * 10/2019 Sharma ............. G06Q 10/0833
(Continued)

FOREIGN PATENT DOCUMENTS

CN 102419843 A 4/2012
CN 111881795 A 11/2020
(Continued)

OTHER PUBLICATIONS

International Search Report and Written Opinion issued in corresponding PCT Application No. PCT/CN2024/071972, dated Mar. 28, 2024.
(Continued)

*Primary Examiner* — Hasanul Mobin
(74) *Attorney, Agent, or Firm* — Westbridge IP LLC

(57) ABSTRACT

Disclosed are a method for improving identification accuracy of similar logistics tracking numbers, and a logistics query system. The method includes: acquiring the logistics tracking number, calculating a length of the logistics tracking number, screening the logistics channel with a same length of the logistics tracking number from a rule library according to the length of the logistics tracking number, recording all the logistics channels with the same length and calculating number N of the logistics channels; performing preliminary identification of the logistics tracking number according to the number N, the preliminary identification of the logistics tracking number includes: when N=1, using the logistics channel as an identification result of the logistics tracking number; when N≥2, calculating matching precision of the logistics tracking number; and configuring the logis- (Continued)

tics channel with the highest matching precision value as an identification result of the logistics tracking number.

8 Claims, 4 Drawing Sheets

(56) References Cited

U.S. PATENT DOCUMENTS

| | | | | |
|---|---|---|---|---|
| 10,805,270 | B2* | 10/2020 | Jakobsson | H04L 63/1441 |
| 2014/0012772 | A1* | 1/2014 | Pretorius | G06Q 10/08 |
| | | | | 705/330 |
| 2015/0262123 | A1* | 9/2015 | Sharma | H04W 4/02 |
| | | | | 705/333 |
| 2016/0021739 | A1 | 1/2016 | Li et al. | |
| 2016/0217399 | A1* | 7/2016 | Roelofs | G06Q 10/08 |
| 2016/0371643 | A1* | 12/2016 | Parruck | H04W 4/02 |
| 2017/0091706 | A1* | 3/2017 | Lloyd | G06Q 10/0833 |
| 2019/0102733 | A1* | 4/2019 | Fang | G06Q 10/08 |
| 2019/0102962 | A1* | 4/2019 | Miller | G07C 9/00309 |
| 2021/0287269 | A1* | 9/2021 | Fang | H04L 63/12 |
| 2021/0382831 | A1* | 12/2021 | Sun | G06F 16/2315 |
| 2022/0092531 | A1* | 3/2022 | Chislak Huguley | H04W 4/029 |
| 2024/0220913 | A1* | 7/2024 | Bonafe | G06Q 10/0833 |

FOREIGN PATENT DOCUMENTS

| | | |
|---|---|---|
| CN | 113537900 A | 10/2021 |
| CN | 116611803 A | 8/2023 |
| CN | 116662620 A | 8/2023 |
| JP | 2004046692 A | 2/2004 |
| JP | 2019516203 A | 6/2019 |

OTHER PUBLICATIONS

Notice of Reasons for Refusal issued in counterpart Japanese Patent Application No. 2024-558070, dated Sep. 9, 2025.

* cited by examiner

METHOD FOR IMPROVING IDENTIFICATION ACCURACY OF SIMILAR LOGISTICS TRACKING NUMBERS, AND LOGISTICS QUERY SYSTEM

CROSS-REFERENCES TO RELATED APPLICATIONS

The present application is a continuation application of International Application No. PCT/CN2024/071972, filed on Jan. 12, 2024, which claims priority to Chinese Patent Application No. 202310039435.6, filed on Jan. 12, 2023. The disclosures of the above-mentioned applications are incorporated herein by reference in their entireties.

TECHNICAL FIELD

The present application relates to the technical field of computer, and in particular to a method for improving identification accuracy of similar logistics tracking numbers, and a logistics query system, as well as a method and system for querying logistics tracking numbers through email.

BACKGROUND

The current global comprehensive logistics query platform (also known as "logistics query system"), because there are no binding standards in the logistics industry, each logistics channel (also known as "logistics provider") has its own automatic generation method and rules for logistics tracking numbers. There is no uniformly constrained and standardized logistics tracking numbers. For a comprehensive logistics query system, if the more the supported logistics channels, the higher the probability of similar logistics tracking numbers (referring to logistics tracking numbers with the same or very similar rules and difficult to distinguish with the naked eye) conflicting during query, which will lead to the failure of automatic identification of logistics channels, reduce the efficiency of users' query of logistics tracking numbers and affect the user's experience for the logistics query system.

The current common practice is to configure regular matching rules for logistics tracking numbers based on different logistics channels, and then use the rules to distinguish part of the logistics tracking numbers. However, for similar logistics tracking numbers with very close rules, it is difficult to further improve the identification accuracy of logistics channels based on regular matching. Even if logistics channels are identified based on regular matching, the rule configuration will be very complex and inconvenient to maintain and use. In the related art of logistics query system, for similar logistics tracking numbers that cannot be recognized, the user usually manually specifies the corresponding logistics channel. This operation method will consume a lot of time for the user. For transnational logistics channels using other languages, it also brings a lot of trouble and trouble to users' logistics tracking number query work.

In addition, in the e-commerce field where logistics tracking number inquiries are very frequent, buyers generally receive shipping emails from sellers after the goods purchased on various e-commerce platforms are shipped; shipping emails are mainly used to notify buyers that the ordered good has been shipped, and the shipped logistics tracking number or the query link of the logistics tracking number is provided.

If the buyer wants to continuously query and track the logistics tracking number, the current common practice is: after receiving the shipping email, the buyer copies the logistics tracking number in the shipping email and then pastes it into the logistics query platform for query and tracking. For buyers who purchase goods frequently (such as full-time purchasing personnel), this method of querying logistics tracking numbers is inefficient, time-consuming and labor-intensive. In addition, if an abnormality occurs in the logistics process, the buyer cannot understand and intervene the logistics process in time, which may cause unnecessary losses.

Other technical issues related to the present application will be further elaborated later. The above content is only used to assist in understanding the technical solutions of the present application, and does not represent an admission that all the above content is related art.

SUMMARY

The main purpose of the present application is to provide a method for improving recognition accuracy of similar logistics tracking numbers and a logistics query system, aiming to improve the logistics query system's recognition accuracy of logistics channels when querying similar logistics tracking numbers, and improve the query efficiency for international logistics tracking numbers. In addition, the present application also provides a method of querying the logistics tracking number through email and a corresponding logistics query system, which can automatically query the logistics track of the logistics tracking number in the user's (i.e., buyer's) email by forwarding the email and analyzing and identifying the email content. That is to say, the logistics query system automatically analyzes and identifies the logistics tracking number in the user's (buyer's) email, further queries and tracks the logistics track based on the obtained logistics tracking number, and feeds back the logistics query results to the buyer through email, so that the buyer can automatically obtain the query results of the logistics tracking number.

The present application provides a method for improving identification accuracy of similar logistics tracking numbers, applied to identification of logistics channels in a logistics query system, and the method includes:

step S1, acquiring the logistics tracking number, calculating a length of the logistics tracking number, screening the logistics channel with a same length of the logistics tracking number from a rule library according to the length of the logistics tracking number, recording all the logistics channels with the same length and calculating number N of the logistics channels;

step S2, performing preliminary identification of the logistics tracking number according to the number N, the preliminary identification of the logistics tracking number includes: when N is equal to 1, using the logistics channel as an identification result of the logistics tracking number;

step S3, performing matching precision calculation of the logistics tracking number when N is greater than or equal to 2; and step S4, configuring a logistics channel with the highest matching precision value as an identification result of the logistics tracking number;

the matching precision calculation includes step S31 to step S34:

step S31, splitting a constant part and a variable part in a regular expression of the logistics tracking number according to number segment information of each logistics channel, a part of the logistics tracking number that is the same in content and position as the number segment information is used as the constant part of the regular expression, and remaining parts are used as the variable part of the regular expression;

step S32, calculating a length ratio of the constant part in the regular expression of each logistics channel, the length ratio of the constant part is a ratio of a length of the constant part to a length of a corresponding regular expression, the length ratio is used as a matching precision value of the logistics tracking number in a corresponding logistics channel rule;

step S33, sorting the matching precision value of each logistics channel rule by size; and step S34, extracting a logistics channel corresponding to the logistics channel rule with the highest matching precision value.

Other features and technical effects of the present application are explained later in the specification. The technical solutions and related product design plans of the present application are:

For example, for two logistics channels with similar rules for logistics tracking numbers, the logistics tracking number of logistics channel A is 226590455432, and the logistics tracking number of logistics channel B is 123456784312. Both are 12-digit pure digital logistics tracking numbers, which are similar logistics tracking number. The usual approach is to configure the rules as d\{12} and d\{12} respectively according to regular expressions when configuring the rules. This will make it impossible to distinguish the ownership of the two logistics tracking numbers, and it will be impossible to select a more likely logistics channel for identification according to priority. In this case, the usual logistics query system will ask the user to manually specify the corresponding logistics channel to match the logistics tracking number and logistics channel.

By analyzing a large number of similar logistics tracking numbers and logistics channels, the applicant found that many logistics channels have the concept of number segments. For example, the 3rd to 6th digits of the logistics tracking number of logistics channel A have a fixed string of 6590, that is, logistics channel A has a number segment, and the content of the number segment is 6590 characters. The position of the number segment is 3rd to 6th digits, and the length of the number segment is 4 digits. Therefore, the regular expression of logistics channel A can be configured accordingly as \d{2}(6590)\d{6}. There is no fixed string in the logistics tracking number of logistics channel B, and the regular expression of logistics channel B is still \d{12}. In this way, two logistics channels will still be matched during matching, and further distinction cannot be made. To this end, the applicant proposed the concept of calculating the matching precision of regular expressions, and adopted a "rule+algorithm" approach to further identify the logistics channel of the logistics tracking number.

When calculating the matching precision of the regular expression, the constant part and the variable part in the regular expression of the logistics tracking number are split according to the number segment of the logistics channel. The number segment is used as the constant part to calculate the length ratio of the constant part in the regular expression of each logistics channel, the length ratio of the constant part is a ratio of a length of the constant part to a length of a corresponding regular expression, and this length ratio is used as the matching precision value of the logistics tracking number in the corresponding logistics channel rule. If there are only two 12-digit logistics channels in the query system, logistics channel A and logistics channel B, when querying the logistics tracking number 226590455432: for logistics channel A, its number segment information is 6590 from the 3rd to 6th digits, and the length is 4 digits, the length of the logistics tracking number is 12 digits, and its matching precision value is 4 digits/12 digits=33.3%; for logistics channel B, since it does not have a fixed string, the length of the constant part is 0 digits, and its matching precision value is 0 digits/12 digits=0.0%. According to the new rules, the logistics channel with the highest matching precision value is selected as the logistics channel for automatic identification, therefore logistics channel A is used as the identification result of the logistics tracking number.

This kind of matching precision calculation of logistics tracking numbers uses a combination of rules and algorithms to avoid using complex rules to identify the ownership of similar logistics tracking numbers, which facilitates software programming and maintenance. When similar logistics tracking numbers are encountered during query, the user does not need to manually specify the logistics channel, which improves the automatic identification capability of logistics tracking numbers and the query efficiency of international logistics tracking numbers. The identification accuracy is high, and it has the advantages of accurate, fast, efficient and convenient querying. Moreover, compared with ordinary artificial intelligence (AI) learning systems, its calculations are more targeted, faster, the algorithm language is simpler, and the corresponding software programming and maintenance costs are low.

Correspondingly, the present application also provides a logistics query system. The logistics query system includes a logistics tracking number acquisition module, a rule library, a logistics tracking number library, a logistics channel library, a comprehensive calculation module and a query result display module. The comprehensive calculation module is configured to perform an operation instruction contained in the method for improving identification of similar logistics tracking numbers. Other technical solutions and technical effects are described later.

Furthermore, the present application also provides a method for querying logistics tracking numbers through email and a corresponding logistics query system, which is used to automatically query the logistics tracking number in the user's email through the logistics query system. The method of querying the logistics tracking number through email includes:

step Q1, acquiring query permission of the user's mailbox in the logistics query system;

step Q2, setting the email auto-forwarding rules for the email of the user's mailbox, and automatically forwarding the shipping emails for which the logistics tracking number needs to be queried to the system mailbox designated by the logistics query system, and the user's mailbox is the mailbox where the user receives shipping emails;

step Q3, checking, via the logistics query system, the system mailbox and receiving, via the logistics query system, the shipping emails automatically forwarded from the user's mailbox;

step Q4, scanning the content in the shipping email and identifying the logistics tracking number in the shipping email;

step Q5, adding, via the logistics query system, the identified logistics tracking number to the tracking list corresponding to the user's mailbox; and step Q6, automatically querying, via the logistics query system, the logistics tracking number in the tracking list, and determining whether the logistics progress information of the logistics tracking number has been updated by comparing the results of the two inquiries, if the logistics progress information from the later query is different from the previous one, the logistics progress information from the later query is sent to the user's mailbox via the system mailbox.

This method of analyzing logistics tracking numbers according to email information and performing automatic logistics tracking can realize automatic query of logistics tracking numbers, and every time the logistics progress is updated, users can receive corresponding logistics notification emails in a timely manner, thereby acquiring the logistics process information in a timely manner. If an abnormality occurs in the logistics process, users can understand the logistics process in time and intervene to avoid unnecessary losses. Moreover, it only requires one setting, and all subsequent purchase and delivery logistics tracking numbers can be automatically tracked, eliminating the need for manual processing, which greatly improves the query efficiency of logistics tracking numbers.

Other technical solutions and technical effects are described later.

Furthermore, ordinary users in the non-e-commerce field can also automatically query the logistics tracking number in their mailbox by querying the logistics tracking number through email.

Furthermore, the present application also provides a server. The server includes a memory and a processor. The logistics query system in the present application is stored in the memory. The processor can run the operating instructions and corresponding methods of the logistics query system.

Furthermore, the present application also provides a computer device. The computer device includes a memory and a processor. The logistics query system in the present application is stored in the memory. The processor can run the operating instructions and corresponding methods of the logistics query system.

It is noted that in the present application: "regular expression" refers to "rule expression", simply referred to as "regular" or "rule", which is a logical formula for string operations. The logistics tracking number generally refers to large-scale logistics tracking number, small parcel express tracking number and other freight tracking numbers. In the embodiments, the logistics tracking number is not only composed of numbers, but can also be composed of numbers, letters and other characters. In order to simplify and unify related expressions, the logistics channel without the number segment information is expressed as the number segment information of the logistics channel is empty, so that all logistics channels have corresponding number segment information; the length of each number segment information or string is an integer, indicating the number of characters. The number segment information can be referred to as number segment.

BRIEF DESCRIPTION OF THE DRAWINGS

The accompanying drawings are used for further understanding of the present application and do not constitute a limitation of the present application. The contents shown in the accompanying drawings can be real data of the embodiments and belong to the protection scope of the present application.

DETAILED DESCRIPTION OF THE EMBODIMENTS

In order to make the purpose, technical solutions and advantages of the present application more clear, embodiments of the present application will be further described in detail below through specific implementation modes and in conjunction with the accompanying drawings. It should be understood that the specific embodiments described here are only used to explain the present application and are not used to limit the present application.

Figure 1:
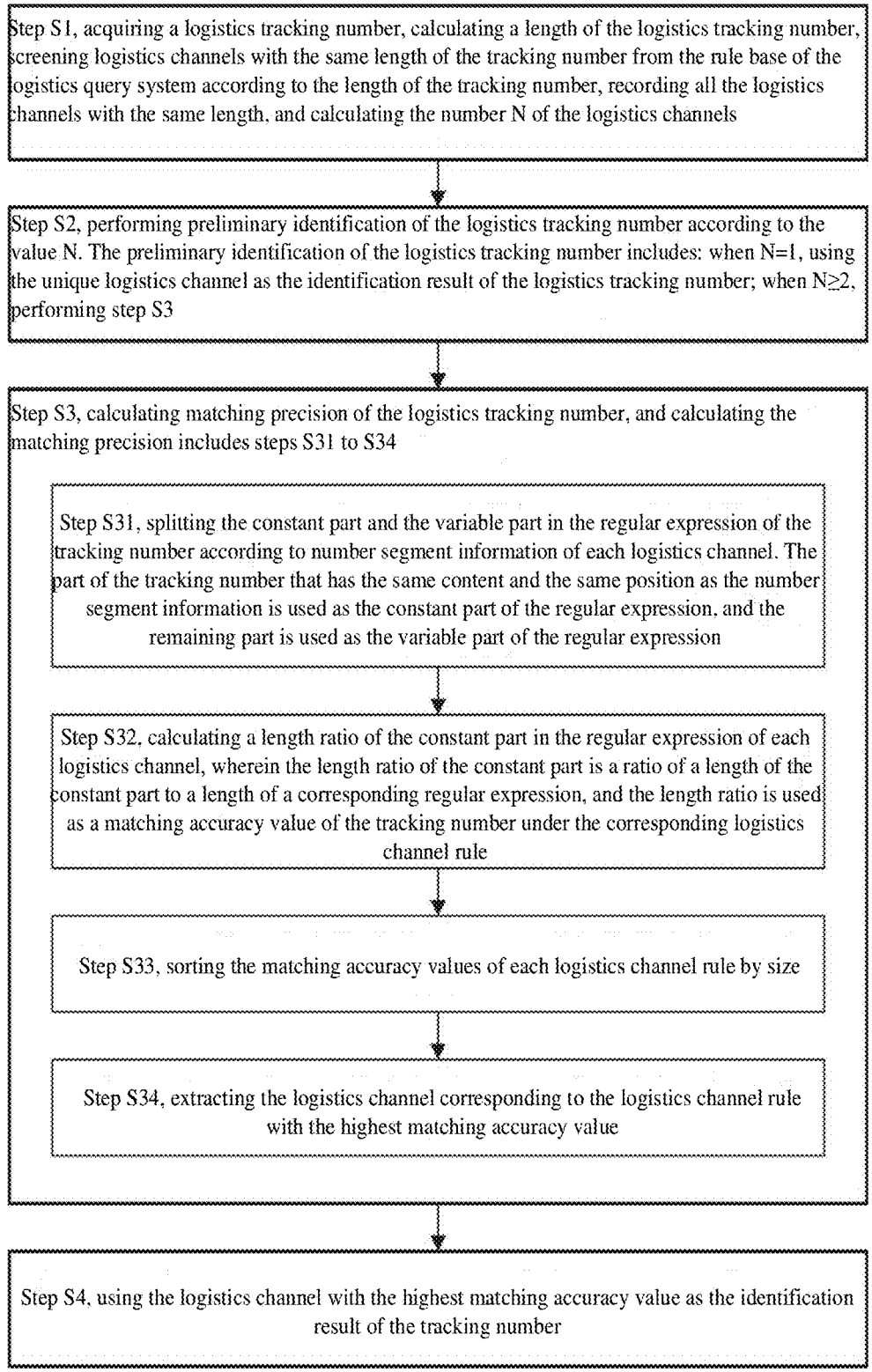
FIG. 1 is a schematic flowchart of a method for improving identification accuracy of similar logistics tracking numbers according to an embodiment of the present application.

Referring to FIG. 1, the present application proposes a method for improving identification accuracy of similar logistics tracking numbers, which is used to identify logistics channels in a logistics query system. The method includes the following steps.

Step S1, acquiring a logistics tracking number, calculating a length of the logistics tracking number, screening logistics channels with the same length of the logistics tracking number from the rule library of the logistics query system according to the length of the logistics tracking number, recording all the logistics channels with the same length, and calculating the number N of the logistics channels.

Step S2, performing preliminary identification of the logistics tracking number according to the number N. The performing preliminary identification of the logistics tracking number includes: when N=1, using the unique logistics channel as the identification result of the logistics tracking number, after logistics channel is identified, the identification calculation of the logistics tracking number ends; when N≥2, performing step S3.

Step S3, calculating matching precision of the logistics tracking number, and calculating the matching precision includes steps S31 to S34.

Step S31, splitting the constant part and the variable part in the regular expression of the logistics tracking number according to number segment information of each logistics channel. The part of the logistics tracking number that has the same content and the same position as the number segment information is used as the constant part of the regular expression, and the remaining part is used as the variable part of the regular expression.

Step S32, calculating a length ratio of the constant part in the regular expression of each logistics channel, the length ratio of the constant part is a ratio of a length of the constant part to a length of a corresponding regular expression, and the length ratio is used as a matching precision value of the logistics tracking number in the corresponding logistics channel rule.

Step S33, sorting the matching precision values of each logistics channel rule by size.

Step S34, extracting the logistics channel corresponding to the logistics channel rule with the highest matching precision value.

Step S4, using the logistics channel with the highest matching precision value as the identification result of the logistics tracking number.

The calculating matching precision of this kind of logistics tracking number uses a combination of rules and algorithms to avoid using complex rules to identify the ownership of similar logistics tracking numbers.

In order for the logistics query system to support the query of multiple logistics channels, it is necessary to support more than 1,000 international logistics channels around the world in real application scenarios, resulting in a huge number of calculations. Before performing step S1, information data of each logistics channel is first stored in the rule library. The information data of the logistics channel includes one or more of the name, the country identification, the length of the logistics tracking number and the number segment information of the logistics channel. The number segment information includes number segment content, number segment position and the number segment length. Each logistics channel has corresponding number segment information. When each logistics tracking number of a certain logistics channel does not contain a string with the same content and the same position, the number segment information of the logistics channel is empty, and the corresponding number segment content of the logistics channel is empty, the number segment position is empty, and the number segment length is zero. When each logistics tracking number of a certain logistics channel contains the string with the same content and the same position, the string is used as the number segment information of the logistics channel. The content of the string, the position of the logistics tracking number and the character length information are respectively used as the number segment content, number segment position and number segment length of the number segment information.

For example, for logistics channel B with the logistics tracking number of 123456784312, since it does not have a fixed string, the number segment information of logistics channel B is empty, the corresponding number segment content and number segment position of logistics channel B are empty, the length of the number segment is zero, and the length of its constant part is also zero.

In an embodiment, for step S3, before performing step S31, N logistics channels with the same length are further screened, and the number segment information of the N logistics channels is analyzed. When the number segment information of a certain logistics channel is not empty, step S31 is performed for the logistics channel; when the number segment information of a certain logistics channel is empty, the matching precision calculation for the logistics channel is abandoned, and the logistics channel is not used as the identification object of the logistics tracking number. Alternatively, when the number segment information of a certain logistics channel is empty, the matching precision corresponding to the logistics channel is directly set to zero, and the calculation starts directly from step S33 in step S3. For logistics channels with empty number segment information, the length of the corresponding constant part is zero, and the corresponding matching precision value is also zero. Therefore, it cannot become the highest matching precision value. The matching precision calculation for the logistics channels with empty number segment information is abandoned in advance, which will not affect the results of the matching precision calculation, and can also simplify the calculation amount and improve the calculation speed.

In an embodiment, when multiple parallel maximum matching precision values appear in step S33, further matching precision calculations are terminated, a prompt is given that the logistics channel cannot be identified, and the user is prompted to manually specify the logistics channel. For example, when the matching precision is calculated, five logistics channels A, B, C, D and E all have the same length of the logistics tracking number. If their matching precision values are 40.0%, 40.0%, 30.0%, 20.0% and 20.0%, at this time, the matching precision values of logistics channel A and logistics channel B are both the maximum matching precision values, and it is difficult to determine the real logistics channel. Although the probability of this scenario is very low, the system terminates the calculation at this time, prompts that the logistics channel cannot be automatically identified, and prompts the user to manually specify the logistics channel, so that the system can further identify the logistics tracking number according to the logistics channel information specified by the user, and collect more information about the identifying characteristics of this logistics channel.

Figure 2:
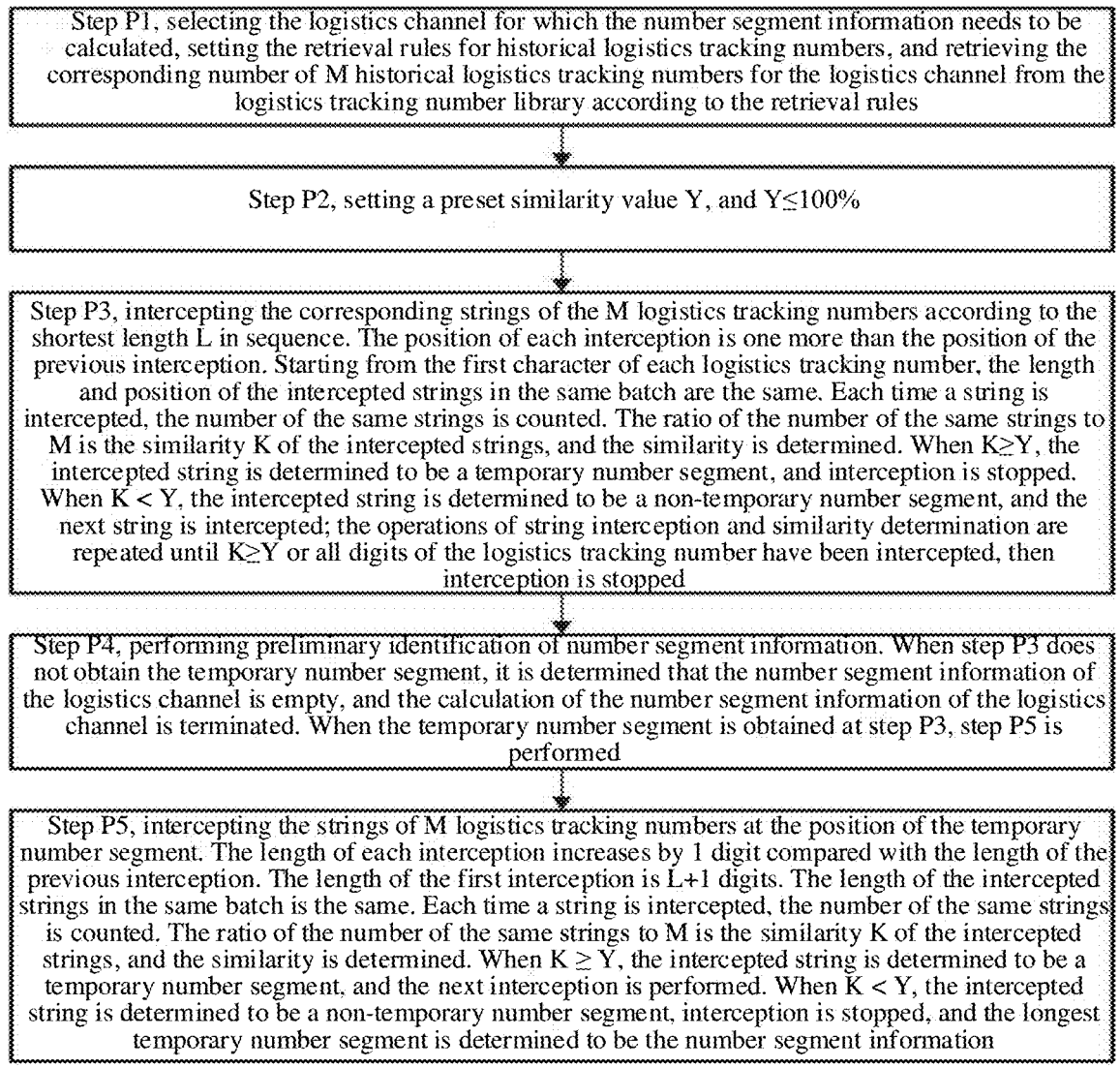
FIG. 2 is a schematic flowchart of a method for number segment information of the logistics tracking number according to an embodiment of the present application.

Referring to FIG. 2, the present application also provides a method for calculating number segment information. The logistics query system also includes a logistics tracking number library, which stores historical logistics tracking numbers that have been queried, and calculates the number segment information of relevant logistics channels according to the historical logistics tracking numbers, including steps P1 to P5, as described later.

Step P1, selecting the logistics channel for which the number segment information needs to be calculated, setting the retrieval rules for historical logistics tracking numbers, and retrieving the corresponding number of M historical logistics tracking numbers for the logistics channel from the logistics tracking number library according to the retrieval rules. For example, all historical logistics tracking numbers within recent T period of time are retrieved, all historical logistics tracking numbers within T1 to T2 period of time are retrieved, or M historical logistics tracking numbers that have recently been queried are retrieved. The larger the M value, the more accurate the analysis. Usually M has higher analytical value only when it reaches 100. In step P1, when the number of historical logistics tracking numbers that can be retrieved from the logistics tracking number library according to the retrieval rules is less than M, the M value is automatically adjusted to be the number of historical logistics tracking numbers that can be retrieved from the logistics tracking number library according to the retrieval rules, and the user is prompted that the M value has been modified to ensure that the value is accurate.

Step P2, setting a preset similarity value Y, and Y≤100%. The preset similarity value Y is used as a reference value of similarity K. The larger the Y value, the higher the similarity of the strings in multiple logistics tracking numbers. When Y=100%, it means that the multiple logistics tracking numbers being compared all contain the same string. When Y=100% is set, its application scenario is mainly for newly imported logistics channels with a small number of historical logistics orders. In the relevant embodiments, 80%≤Y≤100% is suitable for most application scenarios. The Y value is related to the M value. In an embodiment, Y can automatically take a value according to the M value in different intervals. The smaller the M value, the greater the Y value. For example, when the M value is in the interval [1-100], Y=100%; when the M value is in the interval (100-1000], Y=99%; when the M value is in the interval (1000-10000], Y=95%; when M>10000, Y=90%. According to the M value, Y is flexibly adjusted, which can improve the calculation accuracy. According to each interval range, the identification accuracy of the logistics channel at each stage from the beginning of the rule library import to the batch query process can also be verified.

Step P3, intercepting the corresponding strings of the M logistics tracking numbers according to the shortest length L in sequence. The position of each interception is one more than the position of the previous interception. Starting from the first character of each logistics tracking number, the length and position of the intercepted strings in the same batch are the same. Each time a string is intercepted, the number of the same strings is counted. The ratio of the number of the same strings to M is the similarity K of the intercepted strings, and the similarity is determined. When K≥Y, the intercepted string is determined to be a temporary number segment, and interception is stopped. When K<Y, the intercepted string is determined to be a non-temporary number segment, and the next string is intercepted; the operations of string interception and similarity determination are repeated until K≥Y or all digits of the logistics tracking number have been intercepted, then interception is stopped.

The shortest truncation length L can be 1 digit or 2 digits, and L is greater than or equal to 1 and less than the length of the logistics tracking number. For example, in scenario A, four logistics tracking numbers of logistics channel A are retrieved from the logistics tracking number library (only a small number is retrieved to simplify the expression). At this time, M=4, and the four logistics tracking numbers are: A1: 226590455432, A2: 356590545271, A3: 356590635384, and A4: 476590725596. The preset similarity value Y is set to 100%, and the shortest truncation length L is equal to 2 digits. Then in step P3, when intercepting the A1 to A4 logistics tracking numbers, first to second character strings of each logistics tracking number are intercepted respectively, and 22, 35, 35 and 47 digits strings are obtained respectively. At this time, there are 2 identical strings, which is 35, K=2/4=50% is calculated. It can be seen that the result of this interception is K<Y. The string intercepted this time is determined to be a non-temporary number segment, and the next 2nd-3rd digits are intercepted. The 2nd and 3rd digits are intercepted to obtain the strings 26, 56, 56, and 76. Similarly, calculation is performed to obtain K=50%, K<Y, and it is necessary to intercept the next 3rd-4th digits. The 3rd and 4th characters are intercepted to obtain the strings 65, 65, 65, 65, K=100%, K=Y. At this time, the string 65 is a temporary number segment, and the interception can be stopped. If the result of each interception is K<Y, then it will stop at the 11th-12th digits (the last segment).

Step P4, performing preliminary identification of number segment information. When step P3 does not obtain the temporary number segment, it is determined that the number segment information of the logistics channel is empty, and the calculation of the number segment information of the logistics channel is terminated. When the temporary number segment is obtained at step P3, step P5 is performed. For example, in the aforementioned scenario A, the temporary number segment 65 is obtained, but the actual number segment is 6590, which requires further interception and identification of the logistics tracking number. After acquiring the temporary number segment, the location of the temporary number segment is known accordingly. At this time, only the logistics tracking number can be intercepted by length, thereby simplifying the calculation amount and improving the calculation efficiency, as described in step P5.

Step P5, intercepting the strings of M logistics tracking numbers at the position of the temporary number segment. The length of each interception increases by 1 digit compared with the length of the previous interception. The length of the first interception is L+1 digits. The length of the intercepted strings in the same batch is the same. Each time a string is intercepted, the number of the same strings is counted. The ratio of the number of the same strings to M is the similarity K of the intercepted strings, and the similarity is determined. When K≥Y, the intercepted string is determined to be a temporary number segment, and the next interception is performed. When K<Y, the intercepted string is determined to be a non-temporary number segment, interception is stopped, and the longest temporary number segment is determined to be the number segment information.

For example, in the aforementioned scenario A, the temporary number segment 65 is obtained, and the temporary number segment is located at 3rd-4th digits, then the strings in 3rd-5th digits is intercepted for the first time, and the intercepted length is L+1=3 digits. At this time, it can be calculated that the strings 659 in the 3rd to 5th digits is still a temporary number segment, and the next interception of the 3rd to 6th digits is performed. The string 6590 obtained by intercepting the 3rd to 6th digits is still a temporary number segment, and then the next interception of 3rd-7th digits is performed, at this time, different strings 65904, 65905, 65906 and 65907 are obtained, K=0%, K<Y. It is determined that the intercepted string is a non-temporary number segment, interception is stopped, and the longest temporary number segment 6590 obtained by the previous interception is determined as the number segment information.

When there are errors in the historical logistics tracking numbers in the logistics tracking number library, for example, a small number of historical logistics tracking numbers are inconsistent with the actual logistics channels, it will affect the calculation accuracy of the corresponding number segment information of the logistics channel. Therefore, the concept of a preset similarity value is introduced in the present application to avoid some small probability errors affecting the accuracy of calculating logistics channel number segments. For example, when calculating the number segment information of logistics channel A, M=1000 historical logistics tracking numbers of logistics channel A were retrieved from the logistics tracking number library, of which 999 logistics tracking numbers have the same string "6590" in the 3rd-6th digits, and only one logistics tracking number does not have this string in the same position, it is very likely that there is an abnormality in this logistics tracking number. At this time, for the intercepted string "6590", its similarity is K=99.9%. If the preset similarity value Y is 95.0%, then the similarity of the intercepted string 99.9% is greater than the preset similarity value 95.0%. At this time, it is determined that the logistics channel has number segment information.

The temporary number segment is part or all of the characters of the number segment information. When calculating the segment number information, the temporary number segment is first calculated according to the shortest interception length L, and then the complete number segment information is calculated according to the position of the temporary number segment. This method is simple, can reduce the number of string interceptions and similarity determinations, and improves calculation efficiency.

In an embodiment, the logistics query system also includes a logistics tracking number acquisition module. The logistics tracking number acquisition module collects the logistics tracking number information that needs to be queried. When querying the logistics tracking number, the user can manually specify the logistics channels that have been entered in the rule library through the logistics tracking number acquisition module.

Furthermore, when the user specifies the logistics channel to query the logistics tracking number, the validity of the number segment information is verified. When the user specifies the logistics channel to query the logistics tracking number, it is determined whether the logistics tracking number and the number segment information of the logistics channel are consistent. When the two are consistent, it is determined that the number segment information of the logistics channel is valid, and the number segment information is used for querying the next logistics tracking number. When the two are inconsistent, it is further determined whether the logistics tracking number has normal query information feedback on the query platform of the designated logistics channel. If the feedback query information is normal, the number segment information will be marked as abnormal, and the relevant maintenance personnel of the software system will be notified for further processing. If the feedback query information is abnormal or there is no query feedback, it will be deemed that the logistics tracking number is abnormal, and the user will be reminded that the logistics tracking number cannot be recognized. By continuously identifying and calibrating the validity of the number segment information, recognition errors caused when the logistics channel updates the logistics tracking number rules or there are errors in the original number segment information can be avoided, allowing the number segment information to keep the latest and valid state.

In an embodiment, the logistics query system also includes a logistics channel library. The name and number segment information of each logistics channel are stored in the logistics channel library. The number segment information in the logistics channel library can be manually input or modified. For some logistics channels that are familiar with the logistics tracking number rules, system maintenance personnel can directly manually input or modify the number segment information and related content according to the logistics tracking number rules to avoid the system from unnecessary calculation of additional number segment information and improve the system maintenance convenience.

Figure 3:
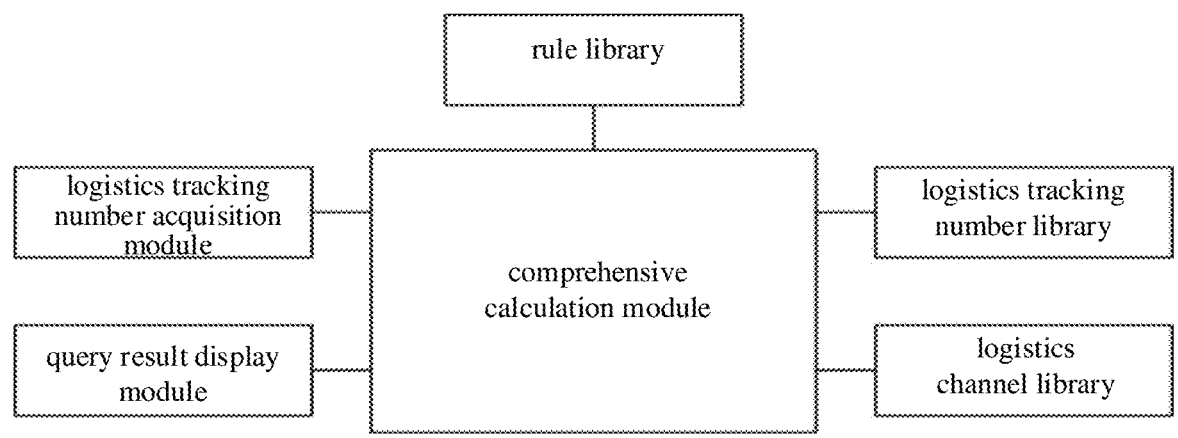
FIG. 3 is a schematic architectural diagram of a logistics query system according to an embodiment of the present application.

Referring to FIG. 3, in related embodiments, the logistics query system includes the logistics tracking number acquisition module, rule library, logistics tracking number library, logistics channel library, and comprehensive calculation module and query result display module described above. The comprehensive calculation module executes the operation instructions included in the method for improving the recognition accuracy of similar logistics tracking numbers in the present application.

In the logistics tracking number library, the stored historical logistics tracking numbers that have been queried are further classified and identified according to user-specified logistics tracking numbers and non-user-specified logistics tracking numbers, and the corresponding designated logistics channel information is identified for the user-specified logistics tracking numbers. At step P1, when M is less than a certain quantity (for example, M≤100), all M logistics channels are obtained from the user-specified logistics tracking numbers. The logistics tracking number, field information and corresponding logistics channel information of the user-specified logistics tracking number have higher accuracy, which can increase the similarity K when the available M value is very small, thus improving the success rate of field information calculation. It is very suitable for calculating number segment information in the scenario where the logistics query system introduces new logistics channels.

When collecting the logistics tracking number information that needs to be queried, the logistics tracking number acquisition module can optionally filter the input information to be queried, delete other characters except letters, numbers and dashes in the information to be queried, and retain a string with more than 5 and less than 50 characters as the logistics tracking number to be queried.

After identifying the corresponding logistics channel according to the obtained logistics tracking number, the logistics query system further determines whether the logistics channel is an air logistics channel or a non-air logistics channel. When the logistics channel is the air logistics channel, the query result display module outputs relevant flight information and logistics process information according to the aviation channel display interface. When the logistics channel is the non-air logistics channel, the query result display module outputs relevant logistics process information according to the ordinary channel display interface. For example, the air channel display interface includes eight cargo status display bar: "All", "Booking", "Received goods", "In transit", "Arrived at destination", "Pickup notification", "Pickup successful" and "Not found". The ordinary channel display interfaces include ten cargo status display bars: "All", "Not found", "Information received", "In transit", "Awaiting pickup", "Out for delivery", "Delivery failed", "Successfully delivered", "Possibly abnormal", "In transit for too long". In the two display interfaces, each cargo status display bar displays the corresponding logistics process information, and the "All" cargo status display bar displays summary information of other cargo status display bars. The query result display module outputs corresponding logistics process information according to different logistics channel type display interfaces. The matching between scenarios and logistics information is stronger and the user experience is improved.

Figure 4:
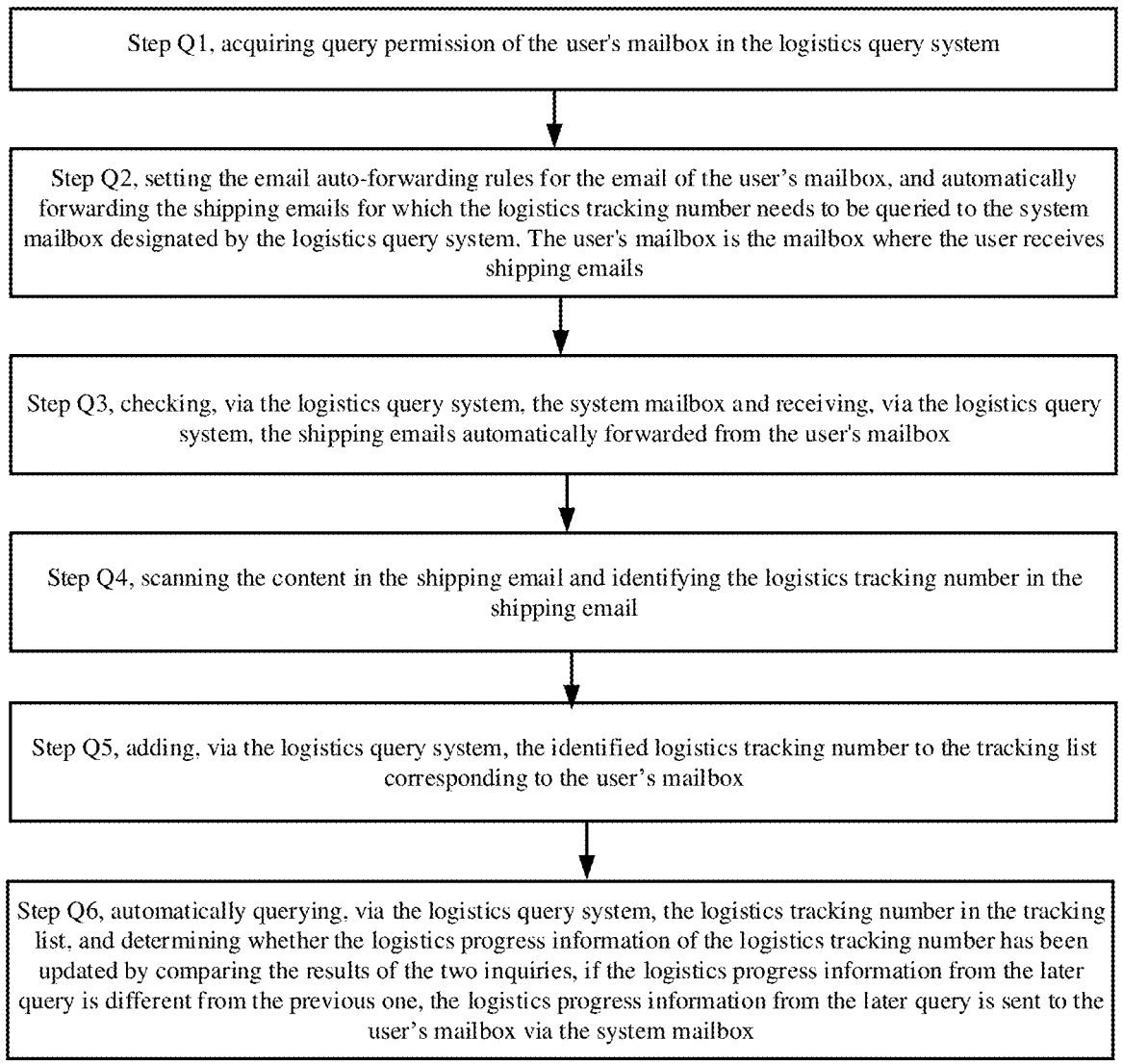
FIG. 4 is a schematic flowchart of a method for querying the logistics tracking number through email according to an embodiment of the present application.

Referring to FIG. 4, the present application also provides a method for querying the logistics tracking number through email and a corresponding logistics query system, which is used to automatically query the logistics tracking number in a user's email through the logistics query system. The method for querying the logistics tracking number through email includes the following steps.

Step Q1, acquiring query permission of the user's mailbox in the logistics query system. For example, the user registers an account in the logistics query system through mailbox, thereby acquiring the query authority for the user's mailbox in the logistics query system.

Step Q2, setting the email auto-forwarding rules for the email of the user's mailbox, and automatically forwarding the shipping emails for which the logistics tracking number needs to be queried to the system mailbox designated by the logistics query system. That is to say, the system mailbox is the associated mailbox of the logistics query system. Setting the system mailbox at one end of the logistics query system can facilitate the unified collection and management of emails from different users and different mailbox types. The user's mailbox is the mailbox where the user receives shipping emails.

In other embodiments, the user can forward the email containing the logistics tracking number to the system mailbox by manual forwarding, and obtain the query result of the logistics tracking number through steps Q3-Q6. It is suitable for temporary tracking of logistics tracking numbers, avoiding setting up auto-forwarding rules for infrequently used shipping emails, and improving the convenience of tracking logistics tracking numbers. The logistics query system is compatible with both manually forwarded shipping emails and automatically forwarded shipping emails from user mailboxes.

Step Q3, checking, via the logistics query system, the system mailbox and receiving, via the logistics query system, the shipping emails automatically forwarded from the user's mailbox. The frequency of checking the system mailbox can be real-time checking or scheduled checking of emails in the system mailbox. For example, the system mailbox can be automatically checked every 2 hours to capture the latest logistics tracks.

Step Q4, scanning the content in the shipping email and identifying the logistics tracking number in the shipping email.

Step Q5, adding, via the logistics query system, the identified logistics tracking number to the tracking list corresponding to the user's mailbox.

Step Q6, automatically querying, via the logistics query system, the logistics tracking number in the tracking list, for example, querying the logistics tracking number every hour or every half hour to ensure the timeliness of acquiring logistics information; and then determining whether the logistics progress information of the logistics tracking number has been updated by comparing the results of the two inquiries, if the logistics progress information from the later query is different from the previous one, it indicates that the logistics progress has been updated, and the logistics progress information from the later query is sent to the user's mailbox via the system mailbox.

When the logistics progress information from the later query is consistent with the previous one, it means that the logistics progress has not been updated, and there is no need to notify the user by email at this time. In addition, when a logistics tracking number is queried for the first time, the queried logistics information is sent directly to the user's mailbox through the system mailbox, without the need to compare the results of the two queries. This automatic tracking query method allows for the logistics tracking number to update the logistics progress every time, enabling the user to receive the corresponding logistics notification emails in a timely manner. If an abnormality occurs in the logistics process, users can understand the logistics process in time and intervene to avoid unnecessary losses.

For step Q1, the method for acquiring the user's mailbox query permission is for the user to register an account in the logistics query system through the mailbox, and the user's registered mailbox can be used as the user's mailbox. When the user's mailbox is inconsistent with the user's registered mailbox, the user's mailbox is bound to the logistics query system through the registered account of the logistics query system. The logistics query system can bind one or more user mailbox under the same registered account, making it easy for users to switch or add delivery mailbox, and is suitable for a variety of application scenarios.

For step Q2, when the email auto-forwarding rules are set in the backend of the user's mailbox, the inbox of the user's mailbox is filtered and only emails from specific mailboxes in the inbox (such as Amazon's shipping notification mailbox or other mailboxes from which the user receives shipping email) is forwarded to the system mailbox. This prevents user's privacy emails from forwarding to the system mailbox.

The operation process of step Q4 includes: scanning the content in the shipping email, analyzing the content of the shipping email, and determining whether the shipping email contains a similar logistics tracking number. The approximate logistics tracking number is the string with a length greater than 5 characters and less than 50 characters, and this string does not contain characters other than letters, numbers, and dashes.

When the similar logistics tracking number is not included in the shipping email, it is determined that the shipping email does not contain the logistics tracking number, and the logistics tracking number in the shipping email is identified as empty; at this time, the execution of steps Q5 and Q6 is terminated, and the user is prompted that the logistics tracking number in the shipping email is abnormal. When the shipping email contains one or more similar logistics tracking numbers, the similar logistics tracking number may be a logistics tracking number or a phone number. The similar logistics tracking number can be identified by the text in front of the similar logistics tracking number.

In shipping emails, the probability of phone numbers and logistics tracking numbers appearing at the same time is very high, and the character length and character content of the two are very similar, making it easy to confuse them. Therefore, by setting the logistics text library and telephone text library to further identify the approximate logistics tracking number to quickly find the logistics tracking number and improve the identification accuracy of the logistics tracking number.

In an embodiment, the logistics query system includes a logistics text library and a telephone text library. The logistics text library is pre-set with logistics words such as "logistics tracking number", "express delivery logistics tracking number", "logistics tracking number", and "express delivery" in different languages. The telephone text library is pre-set with telephone words such as "telephone", "mobile phone" and "landline" in different languages to facilitate targeted screening and identification of email content. In other embodiments, the logistics query system can first identify the language type of the shipping email text (such as Chinese or English), and then select words (including logistics words or telephone words) with the same language type as the shipping email text from the text library (including logistics text library or telephone text library) when identifying the approximate logistics tracking number for identifying, and words with different language types are not identified to improve the efficiency of text identification. When the approximate logistics tracking number is identified through the text content in front of the approximate logistics tracking number, the identification method is: when the paragraph before the approximate logistics tracking number contains any logistics word in the logistics text library, identifying the approximate logistics tracking number as the logistics tracking number; when the paragraph before the approximate logistics tracking number contains any telephone word in the telephone text library, the approximate logistics tracking number is a telephone number, and the approximate logistics tracking number is identified as a non-logistics tracking number.

In addition, when the paragraph before the approximate logistics tracking number contains neither the logistics word in the logistics text library nor the telephone word in the telephone word library, the approximate logistics tracking number is temporarily identified as a temporary logistics tracking number. Since the logistics query system can automatically identify the corresponding logistics channel of the logistics tracking number, the temporary logistics tracking number can also be queried in the logistics query system, and the query results of the logistics query system can be used to determine whether the temporary logistics tracking number is a logistics tracking number. If the logistics query system queries a normal logistics record according to the temporary logistics tracking number, it is determined that the temporary logistics tracking number is a logistics tracking number. If the logistics information queried by the logistics query system according to the temporary logistics tracking number is abnormal, it is determined that the temporary logistics tracking number is a phone number. If all approximate logistics tracking numbers or temporary logistics tracking numbers are identified as phone numbers, the user will be notified that the logistics tracking number information of the shipping email is abnormal and the query results cannot be obtained.

When the paragraph before the approximate logistics tracking number contains both a logistics word in the logistics text library and a telephone word in the telephone word library, the approximate logistics tracking number is temporarily identified as a temporary logistics tracking number. The query results of the logistics query system are used to determine whether the temporary logistics tracking number is a logistics tracking number.

In the present application, when identifying the text before the approximate logistics tracking number, the paragraph before the approximate logistics tracking number has a broad meaning and can be understood as half a sentence, one sentence or multiple sentences before the approximate logistics tracking number to be identified.

In an embodiment, when a certain approximate logistics tracking number is identified as a logistics tracking number, other adjacent logistics tracking numbers following this logistics tracking number are also identified as logistics tracking numbers, and the adjacent approximate logistics tracking numbers refer to that only a space mark is contained between the strings corresponding to adjacent approximate logistics tracking numbers. The space mark can be common string delimiting symbols such as space, Chinese comma, comma, semicolon, newline, comma+newline, semicolon+ newline, etc.

In related application scenarios, when users set mail auto-forwarding rules for their own mailboxes, operational errors or other abnormalities may occur, causing mails other than shipping mails to be forwarded to the system mailbox. For this reason, after receiving the shipping email forwarded by the user's mailbox, the system mailbox further identifies the shipping email to improve the accuracy of email forwarding. When the shipping email does not contain the approximate logistics tracking number, the execution of steps Q5 and Q6 is terminated, and a reminder email is sent to the user's mailbox through the system mailbox, reminding the user that the logistics tracking number in the shipping email is abnormal, and it is recommended that the user re-confirm the mail auto-forwarding rules of user's mailbox.

In an embodiment, when the logistics progress information of the logistics tracking number is found to be the logistics information of the last stage, the logistics tracking number is removed from the tracking list. For example, the logistics information at the last stage indicates that the user has completed pickup, and the logistics tracking number does not need to be tracked further. At this time, the logistics tracking number can be removed from the tracking list.

In an embodiment, when it is found that the logistics progress information of the logistics tracking number has not been updated after a certain fixed time, the logistics tracking number is removed from the tracking list, and the user is prompted that the logistics tracking number is abnormal through the system mailbox. For example, for a certain ordinary logistics package with a half-month time limit, if updated logistics information has not been found for more than 3 months, it means that the logistics package is likely to have stopped or terminated for some reason, so the logistics tracking number can be removed from the tracking list, and the user is prompted that the logistics tracking number is abnormal.

In an embodiment, the system email can be customized in style, and operations such as logos, content templates, product recommendations, etc. can be inserted to improve the user experience.

In an embodiment, when the system email sends an email to the user's mailbox, the content of the email contains the logistics tracking number, and a prompt description of "from mail check" is noted in the email content. The email content includes the title of the email and the body of the email.

The logistics query system of the present application implements the method of querying logistics tracking numbers by email as described above. Its operation process includes: (1) the logistics query system collects the shipping emails forwarded by the user's mailbox through the system mailbox; (2) the logistics query system checks the system mailbox, collects the shipping email automatically forwarded by the user's mailbox, and then scans the content of the shipping email to identify the logistics tracking number in the shipping email; (3) the logistics query system adds the identified logistics tracking number to the tracking list corresponding to user's mailbox; (4) the logistics query system automatically queries the logistics tracking number in the tracking list, and determines whether the logistics progress information of the logistics tracking number has been updated between the two queries, and if the logistics progress information from the later query is different from the previous one, the logistics progress information from the later query is sent to the user's mailbox through the system mailbox.

In other embodiments, the logistics query system of the present application can not only perform the method of querying logistics tracking numbers by email as described above, but also can implement the method for improving the identification accuracy of similar logistics tracking numbers as described above, thereby improving the overall performance of the system.

The above are only some embodiments of the present application, and do not limit the patent scope of the present application. Under the inventive concept of the present application, equivalent transformations can be made by using the contents of the description and drawings of the present application, or directly/indirectly applied in other related technical fields, are included in the scope of the present application.

What is claimed is:

1. A method for improving identification accuracy of similar logistics tracking numbers, applied to identification of a logistics channel in a logistics query system of a computer device, wherein the computer device comprises a memory and a processor, the logistics query system is stored in the memory, and the processor performs operations of the method for improving identification accuracy of similar logistics tracking numbers, the method for improving identification accuracy of similar logistics tracking numbers comprises:
acquiring the logistics tracking number, calculating a length of the logistics tracking number, screening the logistics channel with a same length of the logistics tracking number from a rule library according to the length of the logistics tracking number, recording all the logistics channels with the same length and calculating number N of the logistics channels;
performing preliminary identification of the logistics tracking number according to the number N, wherein the preliminary identification of the logistics tracking number comprises: in response to that N is equal to 1, using the logistics channel as an identification result of the logistics tracking number;

performing matching precision calculation of the logistics tracking number in response to that N is greater than or equal to 2; and configuring a logistics channel with the highest matching precision value as an identification result of the logistics tracking number;

wherein the matching precision calculation comprises:

splitting a constant part and a variable part in a regular expression of the logistics tracking number according to number segment information of each logistics channel, wherein a part of the logistics tracking number that is the same in content and position as the number segment information is used as the constant part of the regular expression, and remaining parts are used as the variable part of the regular expression;

calculating a length ratio of the constant part in the regular expression of each logistics channel, wherein the length ratio of the constant part is a ratio of a length of the constant part to a length of a corresponding regular expression, wherein the length ratio is used as a matching precision value of the logistics tracking number in a corresponding logistics channel rule;

sorting the matching precision value of each logistics channel rule by size; and extracting a logistics channel corresponding to the logistics channel rule with the highest matching precision value.

2. The method for improving the identification accuracy of similar logistics tracking numbers of claim 1, wherein before acquiring the logistics tracking number, calculating the length of the logistics tracking number, screening the logistics channel with the same length of the logistics tracking number from the rule library according to the length of the logistics tracking number, recording all the logistics channels with the same length and calculating number N of the logistics channels, the method further comprises:

storing information data of each logistics channel in the rule library first, wherein the information data of the logistics channel comprises a name of the logistics channel, a length of the logistics tracking number and number segment information, the number segment information comprises number segment content, number segment position and number segment length, and each logistics channel has corresponding number segment information:

in response to that each logistics tracking number of a certain logistics channel does not contain a string with same content and same position, the number segment information of the logistics channel is empty, corresponding number segment content of the logistics channel is empty, the number segment position is empty, and the number segment length is zero;

in response to that each logistics tracking number of a logistics channel contains a string with same content and same position, the string is used as number segment information of the logistics channel, content of the string, a position in the logistics tracking number, and character length information are respectively number segment content, number segment position and number segment length of the number segment information.

3. The method for improving the identification accuracy of similar logistics tracking numbers of claim 2, wherein before splitting a constant part and a variable part in a regular expression of the logistics tracking number according to number segment information of each logistics channel, the method further comprises: screening N logistics channels with the same length, and analyzing number segment information of the N logistics channels; in response to that number segment information of a certain logistics channel is not empty, splitting the constant part and the variable part in the regular expression of the logistics tracking number according to the number segment information of the logistics channel; in response to that number segment information of a certain logistics channel is empty, giving up matching precision calculation for the logistics channel, wherein the logistics channel is not used as an identification object of the logistics tracking number.

4. The method for improving the identification accuracy of similar logistics tracking numbers of claim 2, wherein sorting the matching precision value of each logistics channel rule by size comprises:

in response to that multiple parallel maximum matching precision values appear, ending further matching precision calculation, prompting that the logistics channel cannot be identified, and prompting a user to manually specify a logistics channel.

5. The method for improving the identification accuracy of similar logistics tracking numbers of claim 2, wherein the logistics query system further comprises a logistics tracking number library, and the logistics tracking number library stores historical logistics tracking numbers that are queried, and calculating number segment information of the logistics channel according to the historical logistics tracking numbers comprises:

selecting a logistics channel for which number segment information needs to be calculated, setting a retrieval rule for the historical logistics tracking number, and retrieving a corresponding number of M historical logistics tracking numbers for the logistics channel from the logistics tracking number library according to the retrieval rule;

setting a preset similarity value Y, wherein Y is equal to or less than 100%;

intercepting corresponding strings of the M logistics tracking numbers according to the shortest length L in sequence, wherein a position of each interception is increased by one compared to a position of previous interception; starting from a first character of each logistics tracking number, a length and a position of a string intercepted in the same batch are the same;

each time a string is intercepted, a number of same strings is counted; a ratio of the number of the same strings to M is similarity K of a intercepted string; the similarity is determined: in response to that K is greater than or equal to Y, it is determined that the intercepted string is a temporary number segment, and the interception is stopped; in response to that K is less than Y, it is determined that the intercepted string is a non-temporary number segment, and the next string is intercepted; repeating operations of string interception and similarity determination, and stopping intercepting after K is equal to or greater than Y or all digits of the logistics tracking number are intercepted;

preliminary identifying number segment information, wherein in response to that the temporary number segment is not obtained, it is determined that the number segment information of the logistics channel is empty, and calculation of the number segment information of the logistics channel is terminated; and in response to that the temporary number segment is obtained, intercepting M strings of logistics tracking numbers at a position of the temporary number segment, wherein a length of each interception is increased by one digit compared to a length of previous interception; a length of first interception is L+1 digits, and a length of the strings intercepted in the same batch are the same; each time the strings are intercepted, a number of same strings is counted; a ratio of the number of the same strings to M is similarity K of a intercepted string; the similarity is determined: in response to that K is greater than or equal to Y, it is determined that the intercepted string is a temporary number segment, and the next strings are intercepted; in response to that K is less than Y, it is determined that the intercepted string is a non-temporary number segment, and interception is stopped, and the longest temporary number segment is determined to be number segment information.

6. The method for improving the identification accuracy of similar logistics tracking numbers of claim 5, wherein retrieving a corresponding number of M historical logistics tracking numbers for the logistics channel from the logistics tracking number library according to the retrieval rule comprises: in response to that the number of the historical logistics tracking numbers is less than M, M is automatically adjusted to the number of historical logistics tracking numbers that is retrievable from the logistics tracking number library according to the retrieval rule, and the user is prompted that M is modified; and/or Y automatically takes a value according to M located in different intervals, and the smaller the M, the greater the Y.

7. The method for improving the identification accuracy of similar logistics tracking numbers of claim 1, wherein the logistics query system comprises a logistics channel library, and a name and number segment information of each logistics channel are stored in the logistics channel library; and the number segment information in the logistics channel library is capable to be manually entered or modified.

8. A logistics query system, comprising a logistics tracking number acquisition module, a rule library, a logistics tracking number library, a logistics channel library, a comprehensive calculation module and a query result display module, wherein the comprehensive calculation module executes an operation instruction comprised in the method for improving the identification accuracy of similar logistics tracking numbers of claim 1.

* * * * *